Figure 1:
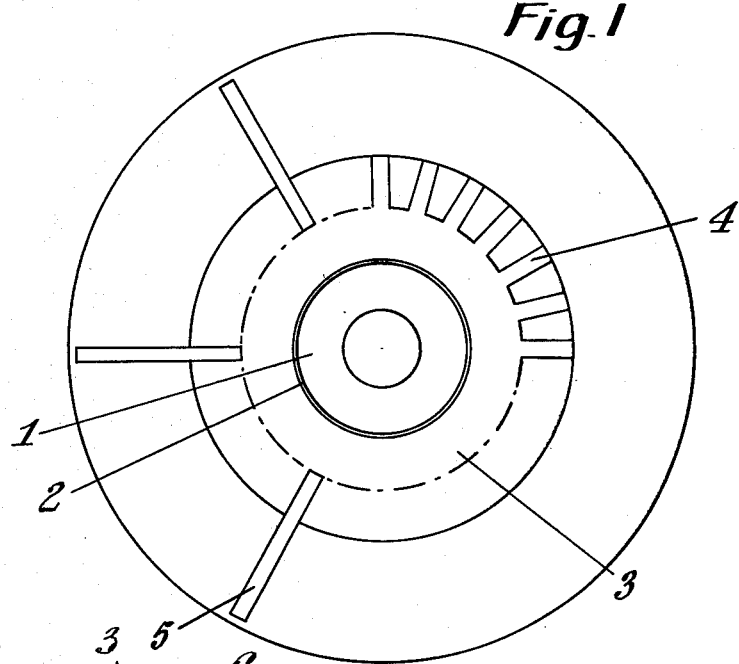

April 17, 1962    H. H. L. RITZ    3,030,292
FUEL ELEMENTS FOR NUCLEAR REACTORS
Filed Aug. 2, 1957

Inventor
H.H.L.Ritz

United States Patent Office 3,030,292
Patented Apr. 17, 1962

3,030,292
FUEL ELEMENTS FOR NUCLEAR REACTORS
Hugo Heinrich Ludolf Ritz, Newcastle-upon-Tyne, England, assignor to C. A. Parsons & Company Limited, Newcastle-upon-Tyne, England
Filed Aug. 2, 1957, Ser. No. 675,922
Claims priority, application Great Britain Aug. 3, 1956
4 Claims. (Cl. 204—193.2)

This invention relates to fuel elements for nuclear reactors.

In the main, fuel elements in use at the present time consist of a container in which is housed the nuclear fuel. In reactors for power production the heat developed in the nuclear fuel, during operation of the reactor, is removed by passing a cooling fluid over the surface of the container, the cooling fluid then being caused to give up this heat either directly or through an intermediary fluid in a thermal power plant.

The material used for the container for the nuclear fuel must have low neutron absorption properties and the more easily obtainable of such substances have suffered from the disadvantage that their strength properties deteriorate seriously at high temperature. It is possible to use materials such as beryllium, that is to say, materials which have low neutron absorption properties and sufficient strength at high temperatures, but in general they are not readily available and extremely expensive. Another disadvantage is that materials such as beryllium are difficult to shape and in most cases efficient removal of heat from the fuel container depends on the use of some form of extended surface, for example, fins on the surface of the container. Even if the manufacture of the main body of the container could be achieved with these materials, the use of the material for fins would make the cost prohibitive.

The object of the present invention is to provide a fuel element construction which enables materials such as beryllium to be used and hence allow for increased operating temperatures in the reactor and yet which enables the amount of such material necessary to be kept to a minimum or a low figure.

The invention consists in a fuel element for a nuclear reactor which element comprises a container for nuclear fuel which container is housed in a graphite container having extended surfaces, for example, finned surfaces.

The invention also consists in a fuel element for a nuclear reactor in accordance with the preceding paragraph in which the axial length of the container housing the fuel is made smaller than the axial length of the graphite container.

The invention also consists in a fuel element for a nuclear reactor in accordance with either of the preceding two paragraphs in which the graphite container has fins disposed in helical fashion about its longitudinal axis.

The invention also consists in a fuel element for a nuclear reactor in accordance with the preceding paragraph in which the passages between the fins are interrupted by longitudinal baffles extending for the length of the graphite container.

Figure 2:
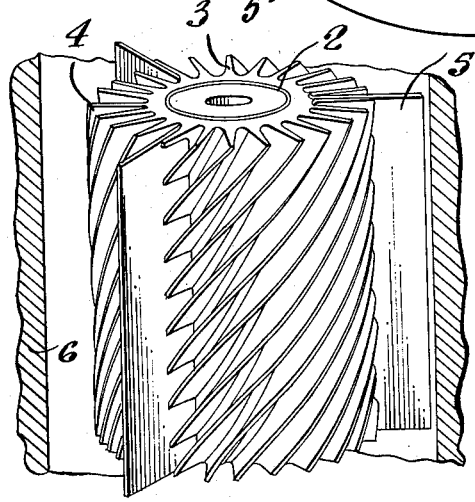

The invention also consists in a fuel element for a nuclear reactor substantially as described below with reference to the accompanying diagrammatic drawing, in which FIG. 1 shows a plan view of a fuel element in accordance with one form of the present invention and FIG. 2 is a schematic isometric of the fuel element.

In carrying the invention into effect in the form illustrated by way of example, a fuel element for a nuclear reactor comprises a nuclear fuel 1 housed in a container 2 of beryllium or other materials having the requisite neutron absorption properties and having good strength properties at temperatures of the order of 500° C. and low neutron absorption properties.

The container 2 is housed in a graphite container 3 which has an extended surface in the form of fins 4. These fins may be helically disposed about the longitudinal axis of the elements as described in my co-pending patent application Ser. No. 618,258, filed October 25, 1956, for Improvements in Heat Transfer Between a Surface and a Liquid. Similarly the passages between the fins may be interrupted by longitudinally extending baffles 5 in the way described in that specification.

The graphite container 3 extends axially at each end beyond the container 2 so that if the elements are stacked one on top of the other in a reactor no load is borne by the fuel or the material of the container 2 and this keeps the thickness required for such material to a minimum. Furthermore, in the form illustrated, difficulties of shaping are overcome by the fact that the container has a plane surface. The efficiency of heat removal is substantially unimpaired, as the graphite container has extended surfaces in contact with a cooling fluid and the graphite is a good conductor of heat.

The longitudinal strips or baffles 5 may be of graphite or of metal and can if desired, be so constructed that some or all of them make contact with the walls of a moderating material to locate the element and to ensure that when several elements are housed in one channel in a moderating material they are co-axial.

I claim:

1. A fuel element for a nuclear reactor which element comprises a container for nuclear fuel, and a graphite container housing the said nuclear fuel container and having external fins extending in a generally axial direction, the said graphite container being adapted for insertion in a bore in a nuclear reactor moderator through which cooling fluid is circulated and comprising means for centering the fuel element in a bore.

2. A fuel element for a nuclear reactor as claimed in claim 1 in which the axial length of the container housing the fuel is smaller than the axial length of the graphite container.

3. A fuel element for a nuclear reactor as claimed in claim 1 in which the graphite container has fins disposed in helical fashion about its longitudinal axis.

4. A fuel element for a nuclear reactor as claimed in claim 3 in which the passages between the fins are interrupted by longitudinal baffles extending for the length of the graphite container.

References Cited in the file of this patent

UNITED STATES PATENTS

| 2,782,158 | Wheeler | Feb. 19, 1957 |
| 2,831,807 | McGarry | Apr. 22, 1958 |

FOREIGN PATENTS

| 286,658 | Switzerland | Oct. 31, 1952 |